United States Patent
Cheng et al.

(10) Patent No.: US 12,026,995 B2
(45) Date of Patent: Jul. 2, 2024

(54) METHOD FOR FAULT DETECTION AND VEHICLE DISPLAY FAULT DETECTION SYSTEM

(71) Applicant: AU Optronics Corporation, Hsin-Chu (TW)

(72) Inventors: Yung-Lin Cheng, Hsin-Chu (TW); Feng-Ming Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 358 days.

(21) Appl. No.: 17/513,922

(22) Filed: Oct. 29, 2021

(65) Prior Publication Data

US 2023/0049671 A1   Feb. 16, 2023

(30) Foreign Application Priority Data

Aug. 13, 2021   (TW) .................. 110130001

(51) Int. Cl.
*G07C 5/08* (2006.01)
*B60W 50/14* (2020.01)

(52) U.S. Cl.
CPC .......... *G07C 5/0816* (2013.01); *B60W 50/14* (2013.01); *G07C 5/0808* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 8,589,018 | B2* | 11/2013 | Sarnacke | B60R 25/00 701/29.2 |
| 9,043,073 | B2* | 5/2015 | Ricci | G06F 11/079 340/439 |
| 2010/0205450 | A1* | 8/2010 | Sarnacke | B60R 25/00 713/185 |
| 2013/0204484 | A1* | 8/2013 | Ricci | G06F 17/00 701/29.6 |
| 2019/0114132 | A1* | 4/2019 | Chu | G09G 5/006 |
| 2019/0392742 | A1* | 12/2019 | Muraki | G09G 3/006 |
| 2020/0262294 | A1 | 8/2020 | Gautier | |
| 2023/0049671 | A1* | 2/2023 | Cheng | B60K 35/00 |

FOREIGN PATENT DOCUMENTS

| | | | | |
|---|---|---|---|---|
| CN | 110634430 A | * | 12/2019 | ............ G09G 3/006 |
| CN | 110634430 A | | 12/2019 | |
| TW | 1652659 B | | 3/2019 | |
| TW | i652659 B | * | 3/2019 | |
| TW | 201919024 A | * | 5/2019 | |
| WO | WO-2013074866 A1 | * | 5/2013 | ............ B60K 35/00 |

* cited by examiner

*Primary Examiner* — Kevin R Steckbauer
(74) *Attorney, Agent, or Firm* — WPAT, P.C (57) ABSTRACT

A method for fault detection is adapted for a vehicle display fault detection system. The vehicle display fault detection system includes a vehicle system and a display system. The method for fault detection includes following steps: detecting whether a first state of the display system is abnormal or not; when the first state is abnormal, the display system is configured to generate a fault detection signal; classifying to generate a control signal according to the fault detection signal; and adjusting the first state of the display system to a second state.

15 Claims, 11 Drawing Sheets

METHOD FOR FAULT DETECTION AND VEHICLE DISPLAY FAULT DETECTION SYSTEM

CROSS-REFERENCE TO RELATED APPLICATION

This application claims priority to Taiwan Application Serial Number 110130001, filed on Aug. 13, 2021, which is herein incorporated by reference in its entirety.

BACKGROUND

Field of Invention

The present disclosure relates to an electronic device and a method. More particularly, the present disclosure relates to a method for fault detection and a vehicle display fault detection system.

Description of Related Art

Compared with conventional pointer screens, liquid crystal displays in vehicles can present a variety of content. In practice, liquid crystal displays cannot display because a battery is out of power. Liquid crystal displays cannot display due to a malfunction of the electronic components. Various emergencies of a vehicle will affect driving safety.

For the foregoing reason, there is a need to provide other suitable vehicle system to solve the problems of the prior art.

SUMMARY

One aspect of the present disclosure provides a method for fault detection. The method for fault detection is adapted for a vehicle display fault detection system. The vehicle display fault detection system includes a vehicle system and a display system. The method for fault detection includes following steps of: detecting whether a first state of the display system is abnormal or not, wherein when the first state is abnormal, the display system is configured to generate a fault detection signal; classifying to generate a control signal according to the fault detection signal by the vehicle system; and adjusting the first state of the display system into a second state.

Another aspect of the present disclosure provides a vehicle display fault detection system. The vehicle display fault detection system includes a vehicle system and a display system. The display system includes a first display device, a first driving circuit, a second driving circuit, and a timing controller. The first display device includes a first display area and a second display area. The first display area and the second display area are not overlapped with each other. The first display area and second display area are configured to display a display picture together. The first driving circuit is coupled to the first display device, and is configured to control the first display area of the first display device. The second driving circuit is coupled to the first display device and is configured to control the second display area of the first display device. The timing controller is coupled to the first display device, and is configured to detect whether a first state of the display system is abnormal or not. When the first state is abnormal, the timing controller and the first display device are configured to generate a fault detection signal together. The vehicle system is coupled to the display system, and is configured to receive the fault detection signal to classify and generate a control signal according to the fault detection signal so as to adjust the first state of the display system into a second state.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Figure 1:
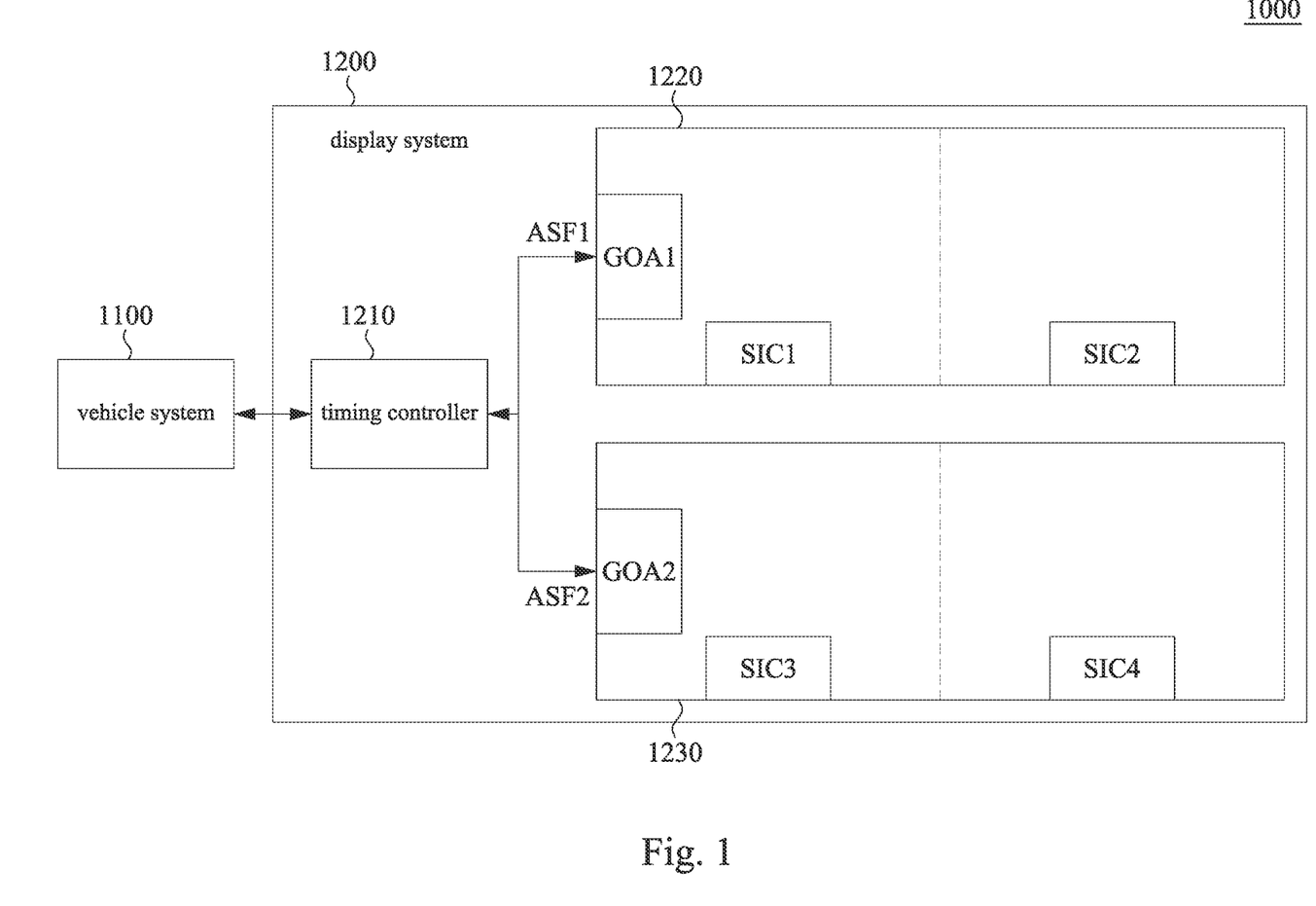
FIG. 1 depicts a schematic diagram of a vehicle display fault detection system according to one embodiment of the present disclosure.

FIG. 1 depicts a schematic diagram of a vehicle display fault detection system 1000 according to one embodiment of the present disclosure. In some embodiments, the vehicle display fault detection system 1000 includes a vehicle system 1100 and a display system 1200. The vehicle system 1100 is coupled to the display system 1200. In some embodiments, a vehicle equipped with the vehicle display fault detection system 1000 includes gasoline vehicles, hybrid cars and electric vehicles with a plurality of display screens.

In some embodiments, the vehicle system 1100 includes a System on a Chip (SoC). The SoC includes chips with a plurality of functions. The chips with the plurality of functions are integrated into a complete chip and are packaged into an integrated circuit. The chips with a plurality of functions include random access memories (RAM), video processors, frame buffers, inter-integrated circuit (I$^2$C) processors or serial peripheral interface Bus (SPI) processors, finite state machines (FSM), and audio processors. In some embodiments, the vehicle system 1100 is configured to summarize driving information of a vehicle to perform calculation so as to provide driving information of a vehicle for driver. The driving information of a vehicle includes an amount of fuel in a vehicle's fuel tank, a speed of a vehicle's engine, a display control of a display system 1200, and a status of vehicle's sensors.

In some embodiments, the display system 1200 includes a timing controller 1210, a first display device 1220, a first driving circuit SIC1, a second driving circuit SIC2, a first gate driving circuit GOA1, a second display device 1230, a third driving circuit SIC3, a fourth driving circuit SIC4, and a second gate driving circuit GOA2. In some embodiments, the first gate driving circuit GOA1, the first driving circuit SIC1, and the second driving circuit SIC2 are coupled to the first display device 1220. It should be noted that a number of display devices of the display system 1200 is not limited to the embodiments shown in the figure.

In some embodiments, the display devices of the display system 1200 include an instrument panel liquid crystal display (LCD) device behind a steering wheel of a front driver's seat, a liquid crystal display (LCD) device of a central console, a side window display device near a front driver's seat, a side window display device near a front passenger seat, and a windshield display device.

In some embodiments, the timing controller 1210 is coupled to the first display device 1220, the first driving circuit SIC1, the second driving circuit SIC2, and the first gate driving circuit GOA1. The first gate driving circuit GOA1 is configured to drive horizontal pixels of the first display device 1220. Each of the first driving circuit SIC1 and second driving circuit SIC2 is configured to drive vertical pixels of the first display device 1220 respectively.

In some embodiments, the timing controller 1210 is coupled to the second display device 1230, the third driving circuit SIC3, the fourth driving circuit SIC4, and the second gate driving circuit GOA2. The second gate driving circuit GOA2 is configured to horizontal pixels of the second display device 1230. Each of the third driving circuit SIC3 and the fourth driving circuit SIC4 is configured to drive vertical pixels of the second display device 1230 respectively. It should be noted that each of the first driving circuit SIC1, the second driving circuit SIC2, the third driving circuit SIC3, the fourth driving circuit SIC4 includes a source driving integrated circuit (IC). A number of source driving integrated circuits is designed according to a size of a display device, and is limited to the embodiments shown in the figure. For example, 23-inches display device is equipped with four source driving integrated circuits.

In some embodiments, the timing controller 1210 includes random access memories (RAM), data processors, inter-integrated circuit (I$^2$C) processors or serial peripheral interface bus (SPI) processors, finite state machines (FSM).

In some embodiments, the timing controller 1210 is configured to receive a plurality of signals (e.g., a first fault detection signal ASF1) of the first display device 1220 and a plurality of signals (e.g., a second fault detection signal ASF2) of the second display device 1230. In some embodiments, the vehicle system 1100 is used for bidirectional signal transmission with the timing controller 1210. It should be noted that the timing controller 1210 has a transmission signal channel for a fault detection signal or a control signal with the first display device 1220 and the second display device 1230. For further illustrations, the vehicle system 1100 is also configured to receive the fault detection signal or the control signal between the timing controller 1210, the first display device 1220, and the second display device 1230.

Figure 2:
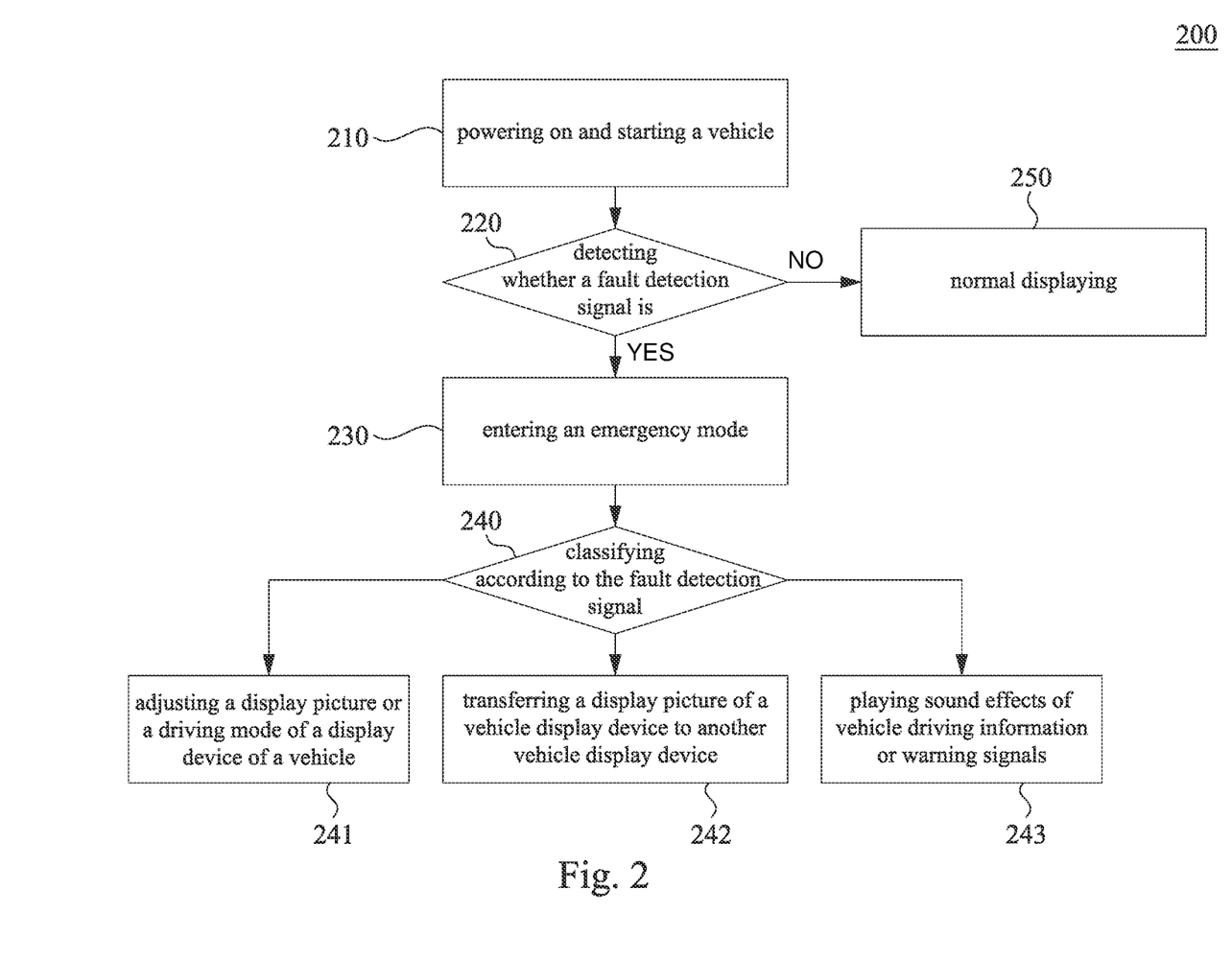
FIG. 2 depicts a flow chart of a method for fault detection according to one embodiment of the present disclosure.

FIG. 2 depicts a flow chart of a method 200 for fault detection according to one embodiment of the present disclosure. In some embodiments, the method 200 for fault detection is executed by the vehicle display fault detection system 1000 shown in FIG. 1. The method 200 for fault detection includes steps described below.

In step 210, powering on and starting a vehicle. In some embodiments, a vehicle equipped with the vehicle display fault detection system 1000 of the present disclosure basically includes a power system. The power system is configured to provide power required by all electronic devices or systems in a vehicle.

In step 220, detecting whether a fault detection signal is. In some embodiments, please refer to FIG. 1 and FIG. 2, when a power system of a vehicle provides power to the vehicle display fault detection system 1000 of the present disclosure, the vehicle system 1100 and the timing controller 1210 of the vehicle display fault detection system 1000 are configured to detect whether a first state of the display system 1200 is abnormal. When the first state of the display system 1200 is abnormal, the display system 1200 is configured to generate fault detection signals (e.g. a first fault detection signal ASF1 or a second fault detection signal ASF2). It should be noted that the timing controller 1210 and the first display device 1220 use a specific channel to transmit the first fault detection signal ASF1 in both directions. The timing controller 1210 and the second display device 1230 use another specific channel to transmit the second fault detection signal ASF2 in both directions. The first fault detection signal ASF1 and the second fault detection signal ASF2 do not affect each other. If any fault detection signal is detected, the vehicle system 1100 and the timing controller 1210 will execute step 230. If the fault detection signal is not detected, the vehicle system 1100 and the timing controller 1210 will execute step 250.

Figure 3:
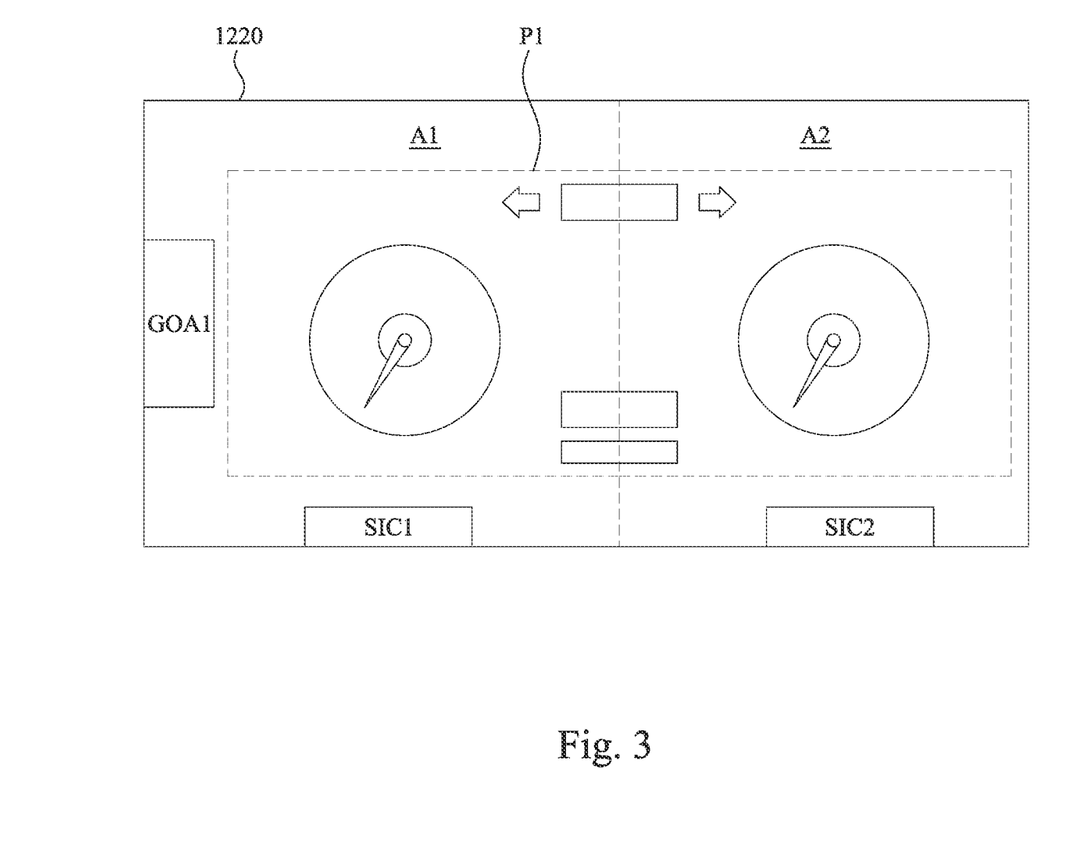
FIG. 3 depicts a schematic diagram of a display picture of a display device of a vehicle display fault detection system according to one embodiment of the present disclosure.

FIG. 3 depicts a schematic diagram of a display picture of a first display device 1220 of a vehicle display fault detection system 1000 according to one embodiment of the present disclosure. In some embodiments, the first display device 1220 includes a first display area A1 and a second display area A2. The first display area A1 and the second display area A2 are not overlapped with each other. The first display area A1 and the second display area A2 are configured to display a display picture P1 together. The first gate driving circuit GOA1 is configured to control the first display area A1 of the first display device 1220 with the first driving circuit SIC1 together. The first gate driving circuit GOA1 is configured to control the second display area A2 of the first display device 1220 with the second driving circuit SIC2 together. It should be note that FIG. 3 shows the first display device 1220 as a normal display state. A size of the display picture P1 is not limited to the embodiments shown in the figure. A size and a location of the first display area A1 and the second display area A2 are not limited to the embodiments shown in the figure. A location of the first gate driving circuit GOA1, the first driving circuit SIC1, and the second driving circuit SIC2 is also not limited to the embodiments shown in the figure. FIG. 3 shows the first display device 1220, which is the instrument panel liquid crystal display (LCD) device behind a steering wheel of a front driver's seat.

In step 230, entering an emergency mode. In some embodiments, please refer to FIG. 1 and FIG. 2, when the vehicle system 1100 and the timing controller 1210 of the vehicle display fault detection system 1000 are configured to detect the fault detection signal, the vehicle system 1100 and the timing controller 1210 will enter an emergency mode or a panic mode so as to exclude a vehicle failure situation or an abnormal first state of a display system 1200.

In step 240, classifying according to the fault detection signal. In some embodiments, when the vehicle system 1100 and the timing controller 1210 of the present disclosure are configured to receive the fault detection signal and enter an emergency mode, the vehicle system 1100 is configured to classify the abnormal first state of the display system 1200 so as to generate a control signal to deal with the abnormal first state and adjust the abnormal first state of the display system 1200 into a normal second state of the display system 1200 according to the fault detection signal. It should be note that in a process of the vehicle system 1100 adjusting the display system 1200, the vehicle system 1100 is configured to perform related operations on the display system 1200 via the timing controller 1210.

In some embodiments, in order to facilitate the understanding of step 240 to step 243 of the method 200 for fault detection of the present disclosure, please refer to FIG. 3 to FIG. 11B, FIG. 4, FIG. 5, FIG. 7, FIG. 8, FIG. 10A, FIG. 10B, FIG. 11A, and FIG. 11B depict a schematic diagram of a display picture of a display device of a vehicle display fault detection system according to one embodiment of the present disclosure. FIG. 6 and FIG. 9 depict a schematic diagram of a signal timing of a timing controller of a vehicle display fault detection system according to one embodiment of the present disclosure.

Figure 4:
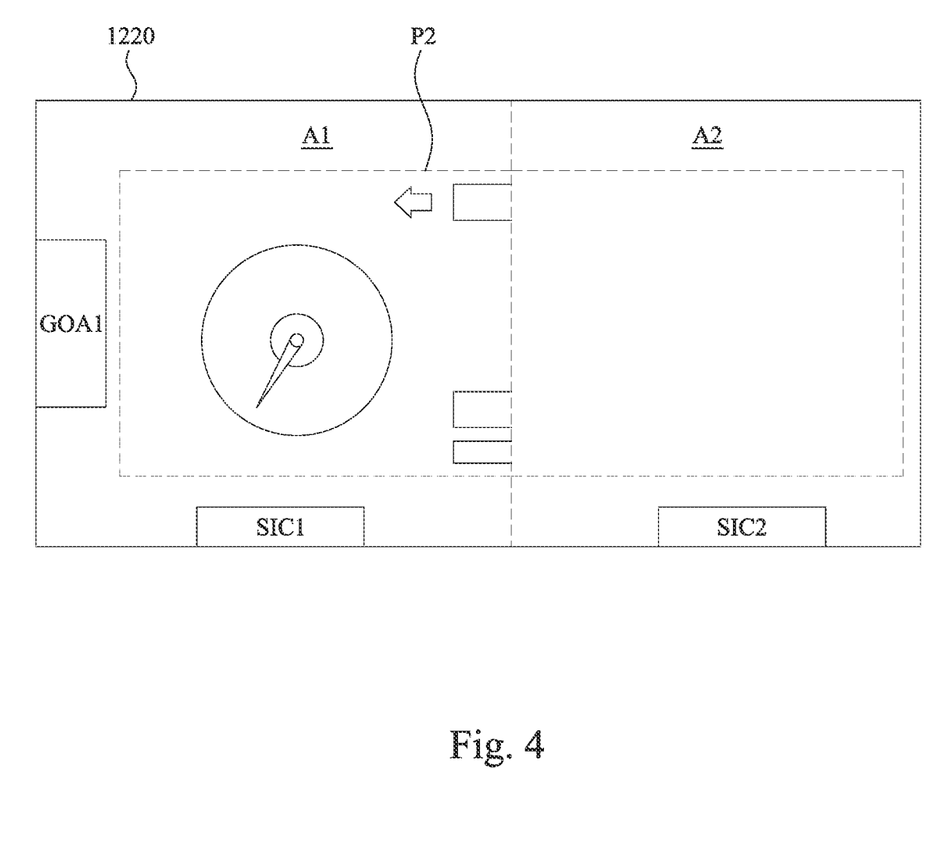
FIG. 4 depicts a schematic diagram of a display picture of a display device of a vehicle display fault detection system according to one embodiment of the present disclosure.

In step 241, adjusting a display picture or a driving mode of a display device of a vehicle. In some embodiments, please refer to FIG. 3 and FIG. 4 together, FIG. 3 shows that a first state of the display system 1200 is in a normal display state. Compared with FIG. 3, FIG. 4 shows that a first state of the display system 1200 is in an abnormal display state, in detail, FIG. 4 shows that the first state of the first display device 1220 of the display system 1200 is in an abnormal display state. For further illustrations, when the first state of the display system 1200 is that one of the first driving circuit SIC1 and the second driving circuit SIC2 is abnormal, one of the first display area A1 and the second display area A2 cannot display a display picture P2. Therefore, the vehicle system 1100 is configured to evaluate the first state of the display system 1200 as a preset level (e.g. a mild damage level) according to the fault detection signal. For example, embodiments in FIG. 4 show that the second driving circuit SIC2 is damaged, which causes the second display area A2 fail to display half the display picture P2.

Figure 5:
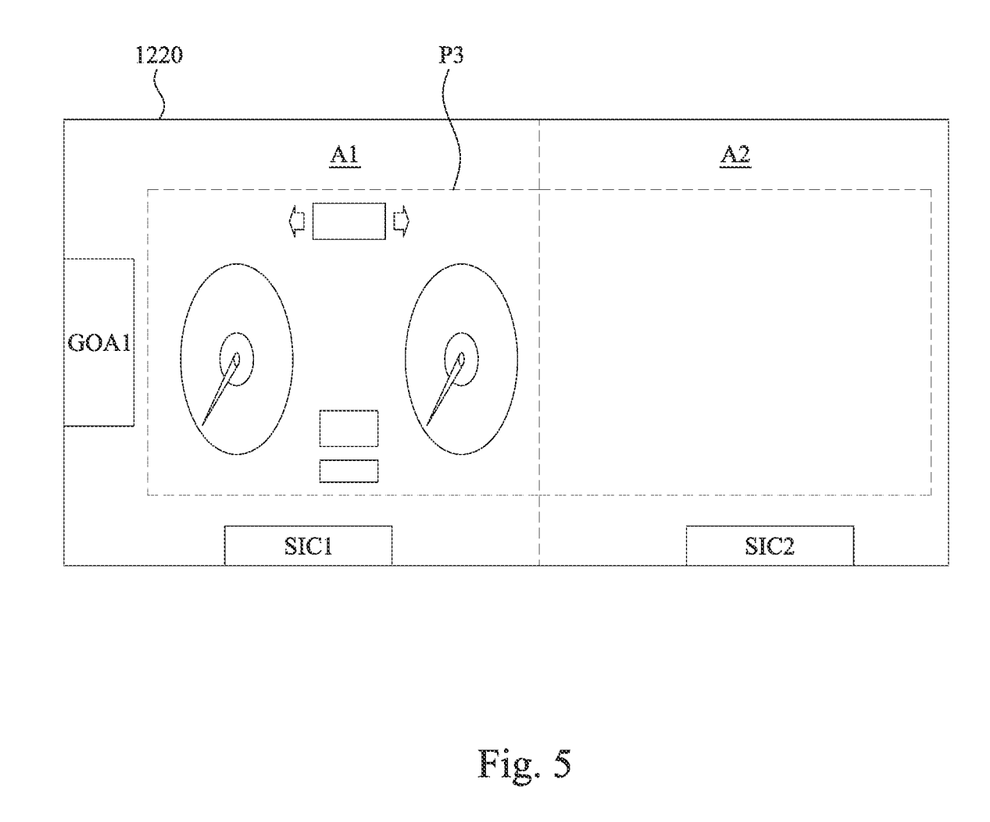
FIG. 5 depicts a schematic diagram of a display picture of a display device of a vehicle display fault detection system according to one embodiment of the present disclosure.
Figure 6:
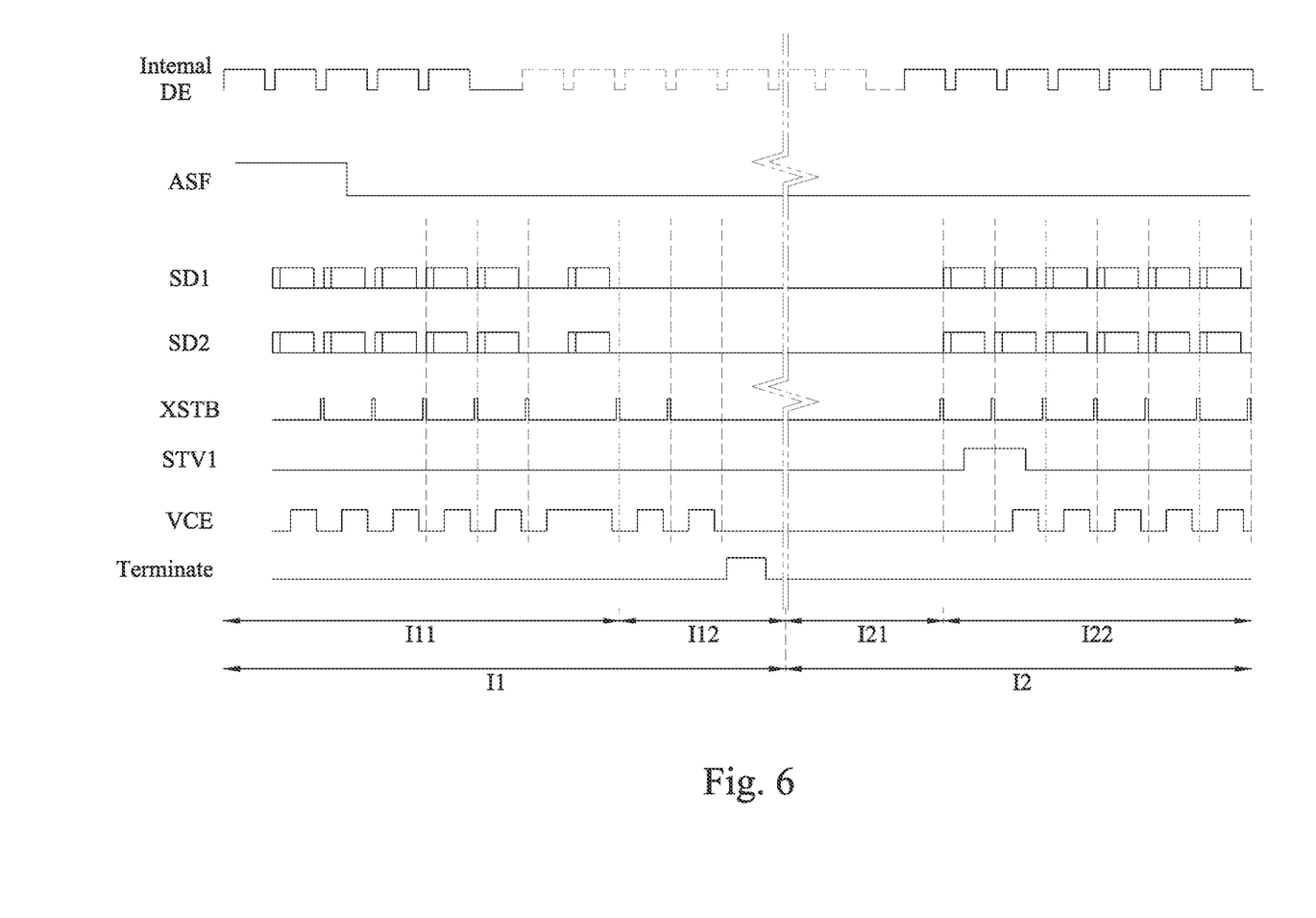
FIG. 6 depicts a schematic diagram of a signal timing of a timing controller of a vehicle display fault detection system according to one embodiment of the present disclosure.

In some embodiments, please refer to FIG. 3 and FIG. 5, after the first display device 1220 is evaluated as the mild damage level by the vehicle system 1100, the vehicle system 1100 is configured to generate a control signal to control the first driving circuit SIC1 via the timing controller 1210 so as to zoom the display picture P1 in FIG. 3 into a display picture P3 in FIG. 5. The display picture P3 in FIG. 5 is a fixed picture of the first display device 1220, which is a second state of the display system 1200. In some embodiments, the display picture P3 in FIG. 5 is a scaling figure of the display picture P1 in FIG. 3. In some embodiments, the display picture P3 in FIG. 5 is a proportional scaling figure or non-proportional scaling figure of the display picture P1 in FIG. 3.

In some embodiments, please refer to FIG. 1 and FIG. 6, FIG. 6 is a time diagram of signals received or output by the timing controller 1210, which is one frame for the timing controller 1210 to drive the first driving circuit SIC1 or the second driving circuit SIC2. One frame includes a first stage I1 and a second stage I2. The first stage I1 is that the display system 1200 is in the first state. The second stage I2 is that the display system 1200 is in the second state. Signal Internal DE is a kind of clock signal. A fault detection signal ASF is the first fault detection signal ASF1 in FIG. 1 or the second fault detection signal ASF2 in FIG. 1. Signal SD1 is the control signal and a display signal about display pictures (e.g. display pictures P1 to P7 of the present disclosure), which are output from the timing controller 1210 to the first driving circuit SIC1. Signal SD2 is the control signal and a display signal about display pictures (e.g. display pictures P1 to P7 of the present disclosure), which are output from the timing controller 1210 to the second driving circuit SIC2. Signal XSTB, Signal STV1, and Signal VCE are basic driving signal. A signal Terminate is a termination signal for the first state of the display system 1200 to change into the second state.

It should be note that a signal SD1 in the first stage I1 and a signal SD1 in the second stage I2 are different driving signals. A signal SD2 in the first stage I1 and a signal SD2 in the second stage I2 are different driving signals. A sub-stage I12 of the first stage I1 and a sub-stage I21 of the second stage I2 are a buffering stage for a transition from the first state of the display system 1200 to the second state.

Figure 7:
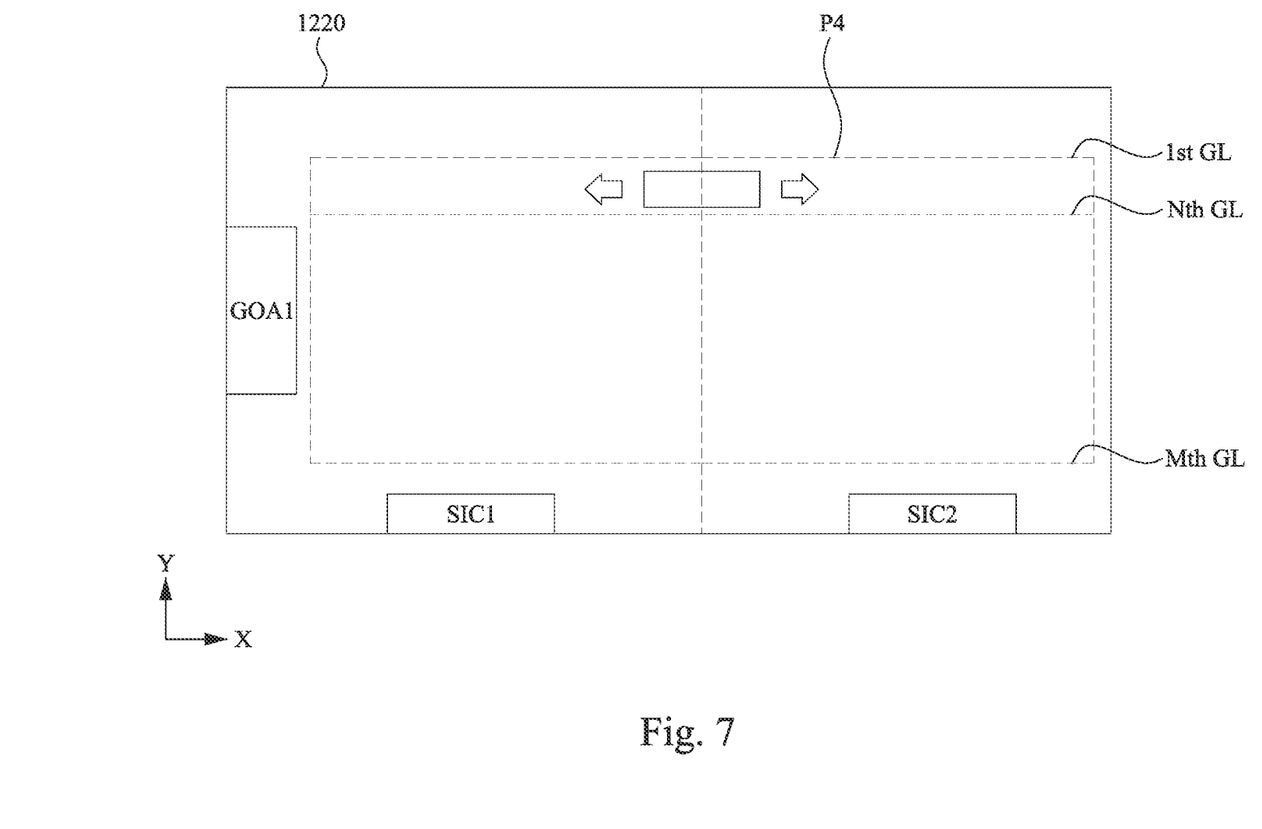
FIG. 7 depicts a schematic diagram of a display picture of a display device of a vehicle display fault detection system according to one embodiment of the present disclosure.

In some embodiments, please refer to FIG. 3 and FIG. 7, FIG. 3 shows that the first state of the display system 1200 is in a normal display state. Compared with FIG. 3, FIG. 7 shows that the first state of the display system 1200 is in an abnormal display state. In detail, FIG. 7 is that the first display device 1220 of the display system 1200 is in an abnormal display state. For further illustrations, when the first state of the display system 1200 is that the first gate driving circuit GOA1 of the first display device 1220 is abnormal, the first display area A1 and the second display area A2 show a display picture P4 shown in FIG. 7. Therefore, the vehicle system 1100 is configured to evaluate the first state of the display system 1200 as a mild damage level according to the fault detection signal.

It should be note that the first gate driving circuit GOA1 is configured to drive and scan pixels of the first display device 1220 via a plurality of gate lines arranged in a vertical direction (a Y-axis direction in the figure). The first gate driving circuit GOA1 is configured to drive a gate line1st GL of a first row from a top of the figure downward to a gate line Mth GL of a Mth-row. A total number of gate lines is M, where M is a positive integer. A gate line Nth GL represents a gate line or a plurality of gate lines starting to be damaged in a Nth row. In some embodiments, the first gate driving circuit GOA1 includes a shift register or a plurality of shift registers, a first gate driving circuit GOA1 uses a gate on array (GOA) technology. Two examples will be provided for reference below.

For example, N is that a gate line of a 10th-row is damaged, and a total number of gate lines M is 720. A first gate driving circuit GOA1 is only configured to drive a gate line1st GL of a first-row to a gate line of a ninth-row, in other words, a gate line 11th GL of a 11th-row to a gate line 720th GL of a 720th-row cannot be configured to drive pixels of the first display device 1220, which causes the first display device 1220 to present a display picture P4 as shown in FIG. 7.

For example, N is that 10th-row to 20th-row gate lines are damaged, and a total number of gate lines M is 720. A first gate driving circuit GOA1 is only configured to drive a gate line 1st GL of a first-row to a gate line of a ninth-row, in other words, a gate line of a 21st-row to a gate line 720th GL of a 720th-row cannot be configured to drive pixels of the first display device 1220, which causes the first display device 1220 to present a display picture P4 as shown in FIG. 7.

Figure 8:
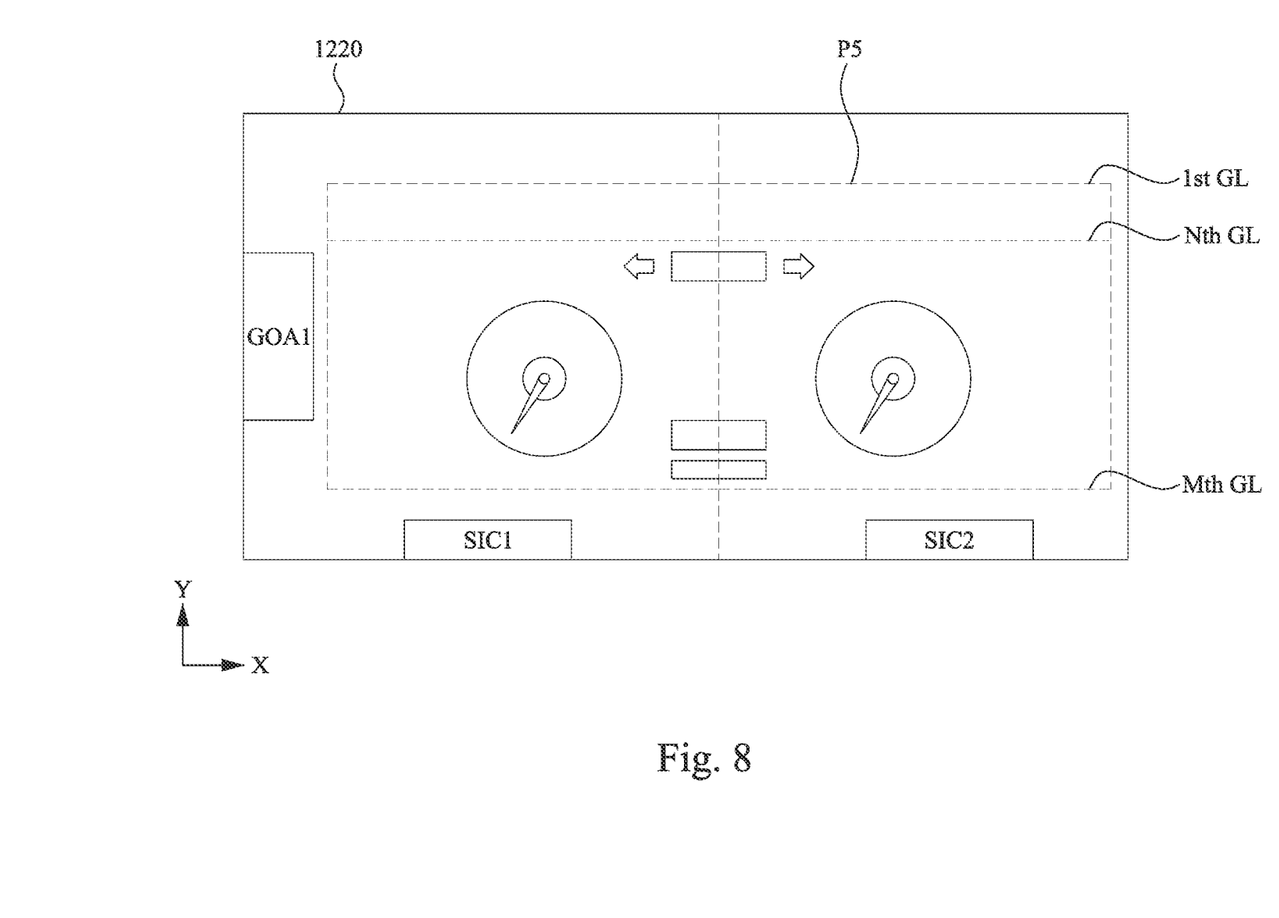
FIG. 8 depicts a schematic diagram of a display picture of a display device of a vehicle display fault detection system according to one embodiment of the present disclosure.
Figure 9:
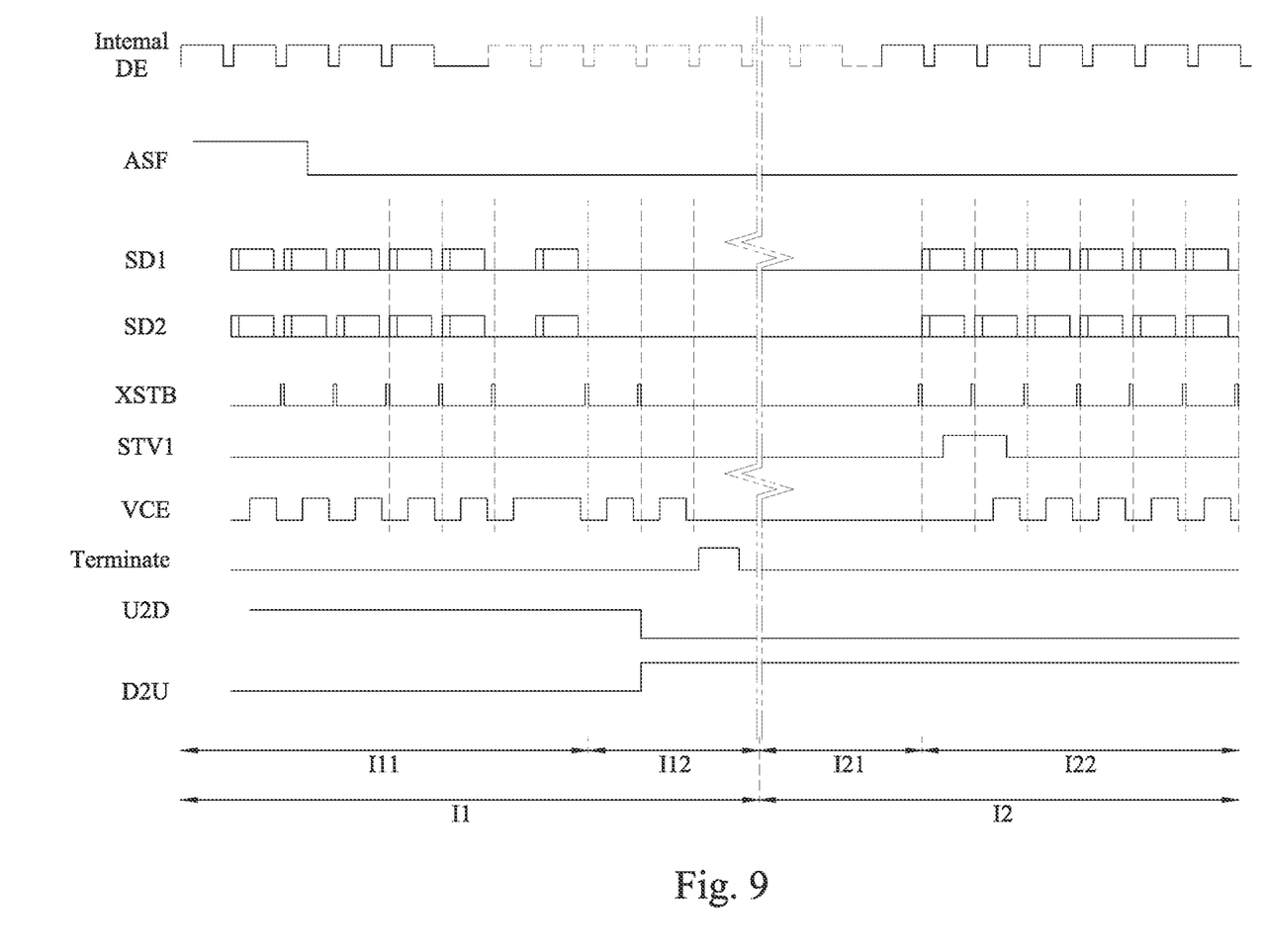
FIG. 9 depicts a schematic diagram of a signal timing of a timing controller of a vehicle display fault detection system according to one embodiment of the present disclosure.

In some embodiments, please refer to FIG. 1 and FIG. 8, after the first display device 1220 is evaluated as a mild damage level by the vehicle system 1100, the vehicle system 1100 is configured to generate a control signal to control the first gate driving circuit GOA1 to change a driving mode via the timing controller 1210. A driving mode is to progressive scan from top to bottom. Change the driving mode is change a driving direction, in detail, the driving mode is changed to progressive scan from bottom to top so as to show a display picture P5 shown in the FIG. 8, which is also a second state of the display system 1200. Two examples described in following paragraphs will follow the aforementioned two examples and serve as reference.

For example, N is that a 10th-row to 20th-row gate lines are damaged, and a total number of gate lines M is 720. The vehicle system 1100 is configured to evaluate a display situation of the first display device 1220, and the vehicle system 1100 is configured to generate a control signal to control the first gate driving circuit GOA1 to change a driving direction of a driving mode via the timing controller 1210, which drives a gate line 720th GL of a 720th-row from bottom to top to a gate line 11th GL of a 11th-row.

For example, N is that a 10th-row to 20th-row gate lines are damaged, and a total number of gate lines M is 720. The vehicle system 1100 is configured to evaluate a display situation of the first display device 1220, and the vehicle system 1100 is configured to generate a control signal to control the first gate driving circuit GOA1 to change a driving direction of a driving mode via the timing controller 1210, which drives a gate line 720th GL of a 720th-row from bottom to top to a gate line 21th GL of a 21th-row.

In summary, the vehicle system 1100 is configured to evaluate a display situation of the first display device 1220 so as to drive the gate drive circuit GOA1 and multiple gate lines based on a principle of displaying a larger display picture through more gate lines.

In some embodiments, please FIG. 6, FIG. 8, and FIG. 9, compared with FIG. 6, a signal timing diagram in FIG. 9 only adds a signal U2D and a signal D2U. The signal U2D and the signal D2U are two signals of changing a driving direction for an aforementioned driving mode.

In step 242, transferring a display picture of a vehicle display device to another vehicle display device.

Figure 10A:
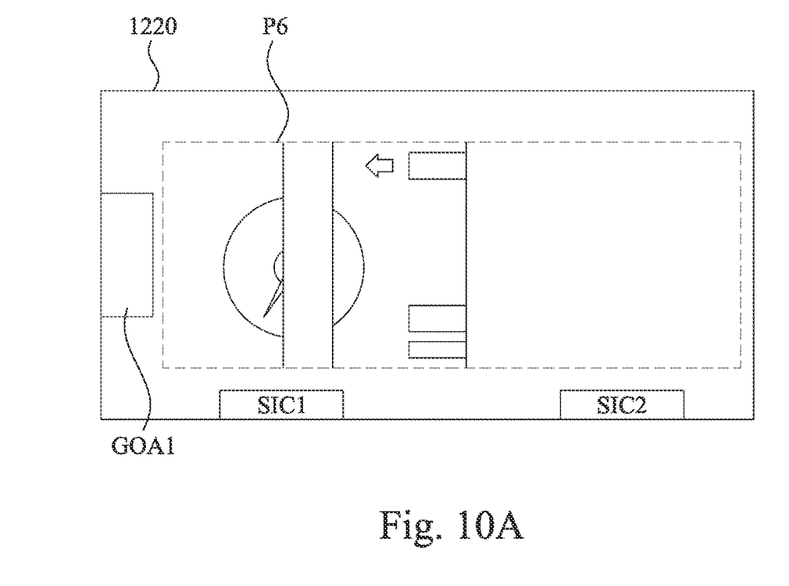
FIG. 10A depicts a schematic diagram of a display picture of a display device of a vehicle display fault detection system according to one embodiment of the present disclosure.
Figure 10B:
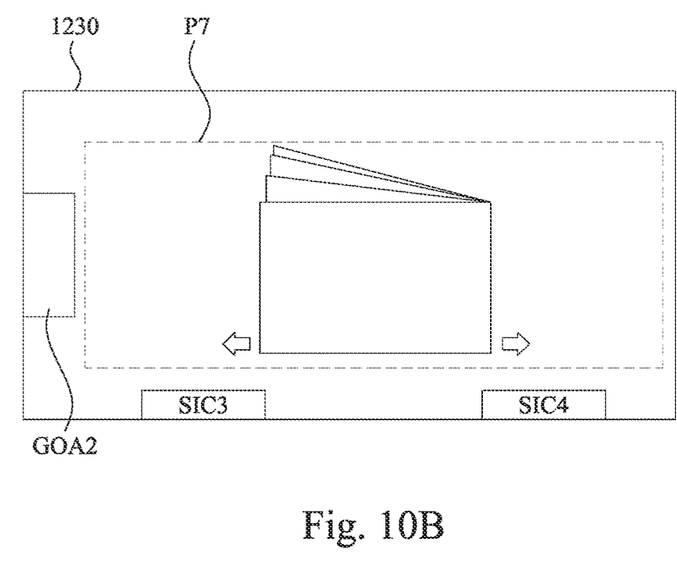
FIG. 10B depicts a schematic diagram of a display picture of a display device of a vehicle display fault detection system according to one embodiment of the present disclosure.

In some embodiments, please refer to FIG. 1, FIG. 2, FIG. 3, FIG. 10A, and FIG. 10B, FIG. 3 shows that the first state of the display system 1200 is in a normal state. Compared with FIG. 3, FIG. 10A shows that the first state of the display system 1200 is in an abnormal state. In detail, FIG. 10A shows that the first display device 1220 of the display system 1200 is in an abnormal state. For further illustrations, when the vehicle system 1100 is configured to evaluate the first state of the display system 1200 as a preset level (e.g., a moderate damage level) according the fault detection signal, the vehicle system 1100 is further configured to evaluate whether the first display device 1220 is sufficient to display a display picture P6. If the first display device 1220 is enough to display the display picture, the display picture P6 is zoomed, which detail steps have been described in the embodiment shown in FIG. 5, and repetitious details are omitted herein. FIG. 10B shows that the second display device 1230 of the display system 1200 is in a normal state. The second display device 1230 is configured to show a display picture P7.

Figure 11A:
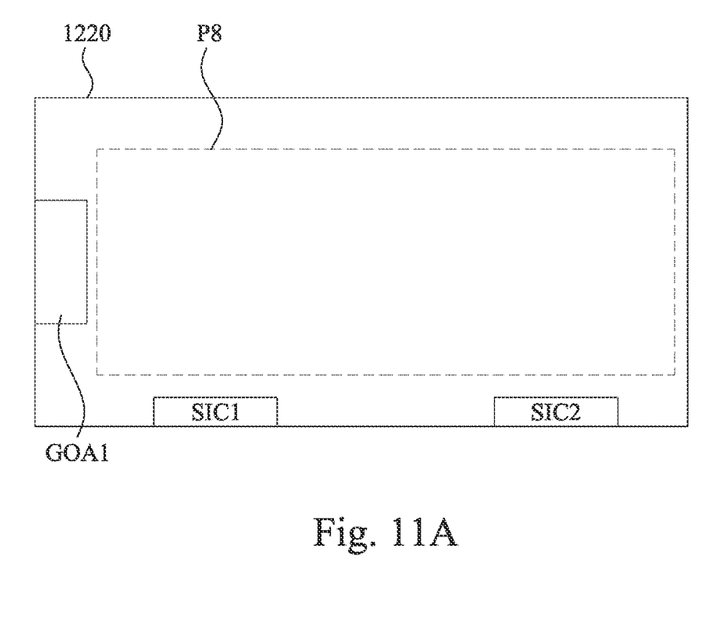
FIG. 11A depicts a schematic diagram of a display picture of a display device of a vehicle display fault detection system according to one embodiment of the present disclosure.
Figure 11B:
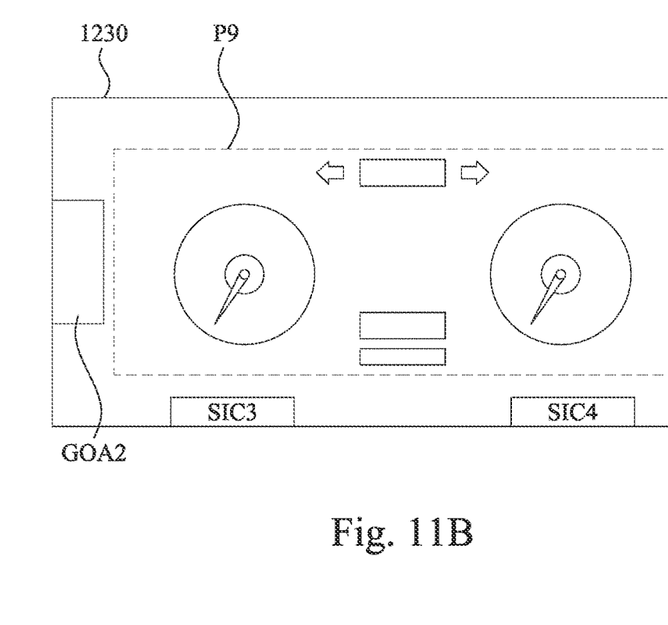
FIG. 11B depicts a schematic diagram of a display picture of a display device of a vehicle display fault detection system according to one embodiment of the present disclosure.

In some embodiments, please refer to FIG. 10A, FIG. 10B, FIG. 11A FIG. 11B, if the first display device 1220 is not enough to display the display picture P6, the vehicle system 1100 is configured to output a control signal so as to transfer the display picture P6 to one of a plurality of the second display device (e.g., the second display device 1230). In the embodiment of FIG. 11A, the first display device 1220 is configured to present a display picture P8, that is, no display picture is displayed. In the embodiment of FIG. 11B, the display picture P6 of the first display device 1220 in FIG. 10A is transferred into the second display device 1230. The second display device 1230 is configured to present a display picture P9. It should be noted that a size of the display picture P9 is limited to a size of the second display device, and may or may not be different from the display picture P6. FIG. 11A and FIG. 11B are the second state of the display system 1200.

In some embodiments, the vehicle system 1100 is further configured to detect a location and a size of the display devices in a vehicle according to the fault detection signals. In some embodiments, the vehicle system 1100 is configured to generate the control signal according to the fault detection signals so as to adjust the display picture of the first display device 1220 of the driver's seat into the other display devices in a vehicle according to the location and the size of the display devices (not shown in the figure).

In some embodiments, the aforementioned step 241 or the aforementioned step 242 can be executed repeatedly.

In step 243, playing sound effects of vehicle driving information or warning signals. In some embodiments, please refer to FIG. 1, when all of display device of a vehicle cannot display vehicle driving information, and the vehicle system 1100 is configured to evaluate the first state of the display system 1200 as a preset level (e.g., a severe damage level) according to the fault detection signal, the vehicle system 1100 is configured to play sound effects of vehicle driving information or warning signals. For example, the vehicle system 1100 is configured to play following sentence via a sound effect processor or a speaker: "A current vehicle speed is 90 and a vehicle cannot display driving information. The speed limit of a current vehicle has been exceeded. Please slow down." or "A vehicle cannot display driving information, please drive to a side of a road or a shoulder of a highway."

In step 250, normal displaying.

Based on the above embodiments, the present disclosure provides a method for fault detection and a vehicle display fault detection system so that the driver can still receive driving information even when display panels in the vehicle are in different broken conditions.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A method for fault detection, adapted for a vehicle display fault detection system, wherein the vehicle display fault detection system comprises a vehicle system and a display system, wherein the method for fault detection comprises:
   detecting whether a first state of the display system is abnormal or not, wherein when the first state is abnormal, the display system is configured to generate a fault detection signal;
   evaluating and classifying the first state into one of preset levels and then generating a control signal according to the one of the preset levels and the fault detection signal by the vehicle system, wherein the preset levels comprises a first level, a second level and a third level; and
   adjusting the first state of the display system into a second state according to the control signal.

2. The method for fault detection of claim 1, wherein evaluating and classifying the first state into one of preset levels and then generating a control signal according to the one of preset levels and the fault detection signal by the vehicle system comprises:
   generating the control signal so as to adjust a display picture or a driving mode of a display device of the display system by the vehicle system when the first state of the display system is evaluated as the first level according to the fault detection signal by the vehicle system.

3. The method for fault detection of claim 1, wherein the display system comprises a first display device, wherein the first display device is configured to display a display picture, wherein evaluating and classifying the first state into one of preset levels and then generating a control signal according to the one of preset levels and the fault detection signal by the vehicle system comprises:
   evaluating whether the first display device is sufficient to display the display picture by the vehicle system when the first state of the display system is evaluated as the second level according to the fault detection signal by the vehicle system; and
   zooming the display picture if the first display device is sufficient to display the display picture.

4. The method for fault detection of claim 3, wherein the display system comprises a plurality of second display devices, wherein evaluating whether the first display device is sufficient to display the display picture by the vehicle system comprises:
   outputting the control signal so as to transfer the display picture to one of the plurality of second display devices by the vehicle system if the first display device is not sufficient to display the display picture.

5. The method for fault detection of claim 1, wherein evaluating and classifying the first state into one of preset levels and then generating a control signal according to the one of preset levels and the fault detection signal by the vehicle system comprises:
   playing sound effects about a plurality of driving information or warning signals of a vehicle by the vehicle system when the first state of the display system is evaluated as the third level according to the fault detection signal by the vehicle system.

6. A vehicle display fault detection system, comprising:
   a display system, comprising:
   a first display device, comprising a first display area and a second display area, wherein the first display area and the second display area are not overlapped with each other, wherein the first display area and the second display area are configured to display a display picture together;
   a first driving circuit, coupled to the first display device, and configured to control the first display area of the first display device;
   a second driving circuit, coupled to the first display device, and configured to control the second display area of the first display device; and
   a timing controller, coupled to the first display device, and configured to detect whether a first state of the display system is abnormal or not, wherein when the first state is abnormal, the timing controller and the first display device are configured to generate a fault detection signal together; and
   a vehicle system, coupled to the display system, and configured to receive the fault detection signal to evaluate and classify the first state into one of preset levels and then generate a control signal according to the one of the preset levels and the fault detection signal so as to adjust the first state of the display system into a second state.

7. The vehicle display fault detection system of claim 6, wherein the display system comprises a gate driving circuit, wherein the gate driving circuit is coupled to the first display device, wherein the gate driving circuit is configured to control the first display area of the first display device with the first driving circuit together, and is configured to control the second display area of the first display device with the second driving circuit together.

8. The vehicle display fault detection system of claim 7, wherein when the first state is that one of the first driving circuit and the second driving circuit is abnormal, the vehicle system is configured to generate the control signal according to the fault detection signal so as to adjust the display picture of the first display device via the timing controller into one of the first display area and the second display area.

9. The vehicle display fault detection system of claim 7, wherein when the first state is that the gate driving circuit is abnormal, the vehicle system is configured to generate the control signal according to the fault detection signal so as to adjust a driving mode of the gate driving circuit via the timing controller.

10. The vehicle display fault detection system of claim 7, wherein the display system further comprises a plurality of second display devices, wherein when the first state is that the first display device is completely abnormal so that the display picture cannot be displayed, the vehicle system is configured to generate the control signal according to the fault detection signal so as to adjust the display picture of the first display device into one of the plurality of second display devices via the timing controller.

11. A vehicle display fault detection system, comprising:
a display system, comprising:
a plurality of display devices, wherein each of the plurality of the display devices is configured to play different display pictures; and
a timing controller, coupled to the plurality of display devices, and configured to detect whether a first state of the plurality of the display devices is abnormal or not, wherein when the first state of one of the plurality of the display devices is abnormal, the timing controller and the plurality of the display devices are configured to generate fault detection signals together; and
a vehicle system, coupled to the display system, and configured to receive the fault detection signals to evaluate and classify the first state into one of preset levels and then generate a control signal according to the one of the preset levels and the fault detection signals so as to adjust the first state of the display system into a second state, wherein the preset levels comprises a mild damaged level, a moderate damaged level and a severe damaged level.

12. The vehicle display fault detection system of claim 11, wherein the plurality of display devices comprise an instrument panel display device of a driver's seat, wherein when the first state is that the instrument panel display device of the driver's seat is abnormal and the vehicle system is configured to evaluate the display system as the mild damaged level, the vehicle system is configured to generate the control signal according to the fault detection signals so as to adjust a display picture or a driving mode of the instrument panel display device of the driver's seat.

13. The vehicle display fault detection system of claim 12, wherein the plurality of display devices further comprise a first display device and a second display device, wherein the vehicle system is further configured to detect a location and a size of the first display device and the second display device in a vehicle according to the fault detection signals.

14. The vehicle display fault detection system of claim 13, wherein when the first state is that the instrument panel display device of the driver's seat is completely abnormal, and the vehicle system is configured to evaluate the display system as the moderate damaged level, the vehicle system is configured to generate the control signal according to the fault detection signals so as to adjust the display picture of the instrument panel display device of the driver's seat into one of the first display device and the second display device according to the location and the size of the first display device and the second display device.

15. The vehicle display fault detection system of claim 14, wherein the first state is that the plurality of display devices are completely abnormal, and the vehicle system is configured to evaluate the display system as the severe damaged level, the vehicle system is configured to generate the control signal according to the fault detection signals so as to playing sound effects about a plurality of driving information or warning signals of the vehicle.

* * * * *